US012611667B2

(12) United States Patent
Wei

(10) Patent No.: US 12,611,667 B2
(45) Date of Patent: Apr. 28, 2026

(54) ISOTOPE ANALYSIS SYSTEM

(71) Applicant: Sun Yat-sen University, Guangzhou (CN)

(72) Inventor: Jing Wei, Guangzhou (CN)

(73) Assignee: Sun Yat-sen University, Guangzhou (CN)

(*) Notice: Subject to any disclaimer, the term of this patent is extended or adjusted under 35 U.S.C. 154(b) by 860 days.

(21) Appl. No.: 17/970,600

(22) Filed: Oct. 21, 2022

(65) Prior Publication Data

US 2023/0045177 A1 Feb. 9, 2023

Related U.S. Application Data

(63) Continuation-in-part of application No. PCT/CN2021/120012, filed on Sep. 23, 2021.

(30) Foreign Application Priority Data

Aug. 3, 2021 (CN) ........................ 202110887720.4

(51) Int. Cl.
*B01L 3/00* (2006.01)

(52) U.S. Cl.
CPC ..... *B01L 3/502715* (2013.01); *B01L 2200/16* (2013.01); *B01L 2300/0654* (2013.01);
(Continued)

(58) Field of Classification Search
CPC ........... B01L 3/502715; B01L 2200/16; B01L 2300/0654; B01L 2300/088; B01L 2300/1805; B01L 2400/0622; H01J 49/04
See application file for complete search history.

(56) References Cited

U.S. PATENT DOCUMENTS 10,309,941 B2 * 6/2019 Wapelhorst ......... H01J 49/0422
2007/0062583 A1 * 3/2007 Cox .................... F16K 99/0013
73/864.22

(Continued)

FOREIGN PATENT DOCUMENTS

CN 102527306 A 7/2012
CN 110763535 A 2/2020

OTHER PUBLICATIONS

Bi-Rong Liu et al., Applications of 15N Pool Dilution and 15N Tracer Techniques in the Quantifying N Transformations of Grasslands: Methodology and Advances, Acta Agrestia Sinica, Nov. 2014, pp. 1153-1162, vol. 22, No. 6.

(Continued)

*Primary Examiner* — Jennifer Wecker
*Assistant Examiner* — Britney N. Washington

(57) ABSTRACT

An isotope analysis system includes: a first liquid channel, second liquid channels, third liquid channels, fourth liquid channels connected with a heating reactor, a diverter, and a selector valve. The diverter is configured to divert liquid from the first liquid channel to the third liquid channels. The selector valve comprises a first liquid outlet and a plurality of first liquid inlets. A third liquid channel and a fourth liquid channel are assigned to each of the plurality of second liquid channels; an end of the fourth liquid channel is connected to both an end of the second liquid channel and an end of the third liquid channel; and a first liquid inlet is assigned to each of the plurality of fourth liquid channels, and another end of the fourth liquid channel is connected to the first liquid inlet.

16 Claims, 3 Drawing Sheets

(52) U.S. Cl.
CPC . *B01L 2300/088* (2013.01); *B01L 2300/1805* (2013.01); *B01L 2400/0622* (2013.01)

(56) References Cited

U.S. PATENT DOCUMENTS

| | | | | |
|---|---|---|---|---|
| 2018/0180639 | A1* | 6/2018 | Diaz | G01N 35/1097 |
| 2019/0310235 | A1* | 10/2019 | Kraus | G01N 31/166 |

OTHER PUBLICATIONS

Hong-Bo He et al., Application of Isotope Dilution Analysis in N Internal Cycle and N Utilization in Soil-plant Systems, Chinese Journal of Soil Science, Jun. 2006, pp. 576-581, vol. 37, No. 3.
Xue Qin, Evaluation of nitrogen sources in the shallow groundwater of West Lake watershed, A thesis submitted for Master Degree in Environmental Science and Engineering at Zhejiang University of Technology, May 2015.
Wolfram Eschenbach et al., Measuring 15N Abundance and Concentration of Aqueous Nitrate, Nitrite, and Ammonium by Membrane Inlet Quadrupole Mass Spectrometry, Analytical Chemistry, May 8, 2017, pp. 6076-6081, vol. 89.

* cited by examiner

ISOTOPE ANALYSIS SYSTEM

CROSS-REFERENCE TO RELATED APPLICATIONS

The present application is a Continuation-In-Part Application of PCT application No. PCT/CN2021/120012 filed on Sep. 23, 2021, which claims the benefit of Chinese Patent Application No. 202110887720.4 filed on Aug. 3, 2021, each of which is incorporated by reference herein in its entirety.

TECHNICAL FIELD

The present disclosure belongs to the technical field of real-time detection of elements, and particularly relates to an isotope analysis system.

BACKGROUND

Environmental protection is becoming increasingly important, and the monitoring of environmental processes (such as the monitoring of nitrogen pollutants and their migration and transformation in environmental media including soil leachate, river water, seawater, and groundwater) is crucial for environmental protection. Isotopic tracer techniques are important tools for process analysis in modern scientific research disciplines including biogeochemistry, climate change, environmental science, ecology, zoology, and botany. Some examples include studying nitrogen transformation in soil during plant growth (see "*Application of $^{15}N$ Pool Dilution and $^{15}N$ Tracer Techniques in the Quantifying N Transformations of Grasslands: Methodology and Advances*" by Liu Birong); studying nitrogen recycling in soil (see "*Application of Isotope Dilution Analysis in N Internal Cycle and N Utilization in Soil-plant Systems*" by He Hongbo and Zhang Xudong); and analysis and detection of nitrogen pollution sources or pollution episodes in the environment (see "*Evaluation of nitrogen sources in the shallow groundwater of West Lake watershed*", Master's thesis by Qin Xue). In an exemplified nitrogen isotope tracer technique, labeled ammonium ($NH_4^+$), hydroxylamine ($NH_2OH$), nitrite ($NO_2^-$), and nitrate ($NO_3^-$) are typically subjected to $^{15}N$ tracing, and the migration and transformation of $^{15}N$ in various nitrogen-containing compounds are monitored to study nitrogen transformation pathways in a system. Existing $^{15}N$ analysis techniques can only detect the abundance of $^{15}N$ in one nitrogen-containing compound (see "*Measuring $^{15}N$ Abundance and Concentration of Aqueous Nitrate, Nitrite, and Ammonium by Membrane Inlet Quadrupole Mass Spectrometry*" by Wolfram Eschenbach, Dominika Lewicka-Szczebak). These techniques are not able to conduct automatic, continuous, and online monitoring of $^{15}N$ abundance in a plurality of nitrogen-containing compounds. Furthermore, these techniques are time-consuming, labor-intensive, and are not effective at quickly capturing biochemical signals from various nitrogen transformation processes in a research system. A technical hurdle in current researches on element cycles is to achieve automatic, continuous, and online monitoring of $^{15}N$ abundance in various nitrogen-containing compounds.

SUMMARY

An objective of the present disclosure is to provide an isotope analysis system to address the technical problem that $^{15}N$ cannot be continuously monitored in the prior art.

To achieve the objective above, the present disclosure provides an isotope analysis system, including: a first liquid channel;

a plurality of second liquid channels;

a plurality of third liquid channels;

a plurality of fourth liquid channels, where a heating reactor is provided at the fourth liquid channels;

a diverter configured to divert liquid from the first liquid channel to the plurality of third liquid channels; and a first selector valve including a first liquid outlet and a plurality of first liquid inlets;

where a third liquid channel and a fourth liquid channel are assigned to each of the plurality of second liquid channels; an end of the fourth liquid channel is connected to both an end of the second liquid channel and an end of the third liquid channel; and where a first liquid inlet is assigned to each of the plurality of fourth liquid channels, and another end of the fourth liquid channel is connected to the first liquid inlet.

Further, the isotope analysis system may further include an actuator configured to drive liquid flow in the plurality of second liquid channels and the plurality of third liquid channels.

Further, the actuator may be a peristaltic pump.

Further, the heating reactor may be an electric heating source; and each of the plurality of fourth liquid channels may include a segment wrapping around the electric heating source.

Further, the isotope analysis system may further include: a fifth liquid channel communicating with the first liquid outlet and a cooler provided at the fifth liquid channel.

Further, the isotope analysis system may further include a membrane-inlet mass spectrometer communicating with the fifth liquid channel.

Further, the isotope analysis system may further include: a degassing device configured to remove a gas in the first liquid channel and the plurality of second liquid channels.

Further, the diverter may include a liquid inlet pipe and a plurality of liquid outlet pipes;

an inlet of the liquid inlet pipe communicates with an outlet of the first liquid channel, and an outlet of the liquid inlet pipe communicates with an inlet of the plurality of liquid outlet pipes; and an outlet of each of the plurality of liquid outlet pipes is connected to an inlet of a specific third liquid channel.

Further, the isotope analysis system may further include a second selector valve and/or a third selector valve, where the second selector valve includes a second liquid outlet and a plurality of second liquid inlets, and the second liquid outlet communicates with an inlet of the first liquid channel; and where the third selector valve includes a third liquid outlet and a plurality of third liquid inlets, and the third liquid outlet communicates with an inlet of the plurality of second liquid channels.

Further, the isotope analysis system may be provided with four second liquid channels.

Beneficial effects: When using the isotope analysis system of the present disclosure for monitoring, a liquid sample containing $^{15}N$ is introduced into a diverter through a first liquid channel. The diverter then diverts the liquid sample to a plurality of third liquid channels (that is, the liquid sample in the first liquid channel flows into various third liquid channels through the diverter). The second liquid channels of the system are each introduced with a unique reagent that can react with a particular $^{15}N$-containing substance (a molecule or an ion). In a fourth liquid channel, a reagent from a particular second liquid channel combines with a liquid sample from a particular third liquid channel to form a liquid mixture. A heating reactor heats the liquid mixture to a predetermined temperature to react. The liquid mixture then flows from this fourth liquid channel to a first selector valve through a particular first liquid inlet designated to this fourth liquid channel. The first selector valve enables the communication between this first liquid inlet and a first liquid outlet, allowing the liquid mixture to be directed out of the system through this outlet. In brief, a liquid sample from a third liquid channel reacts with a specific reagent from a designated second liquid channel in a designated fourth liquid channel. The post-reaction liquid mixture is directed out of the system through a designated first liquid inlet and first liquid outlet and is then monitored. In this way, reactions between the $^{15}$N-containing substance in a liquid sample with different reagents can be monitored separately and continuously.

BRIEF DESCRIPTION OF THE DRAWINGS

To more clearly illustrate the embodiments of the present disclosure, the accompanying drawings required for describing the embodiments or the prior art are briefly described below. The accompanying drawings described below only illustrate some embodiments of the present disclosure. Other drawings can be obtained by the skilled person based on these accompanying drawings without creative efforts.

Figure 1:
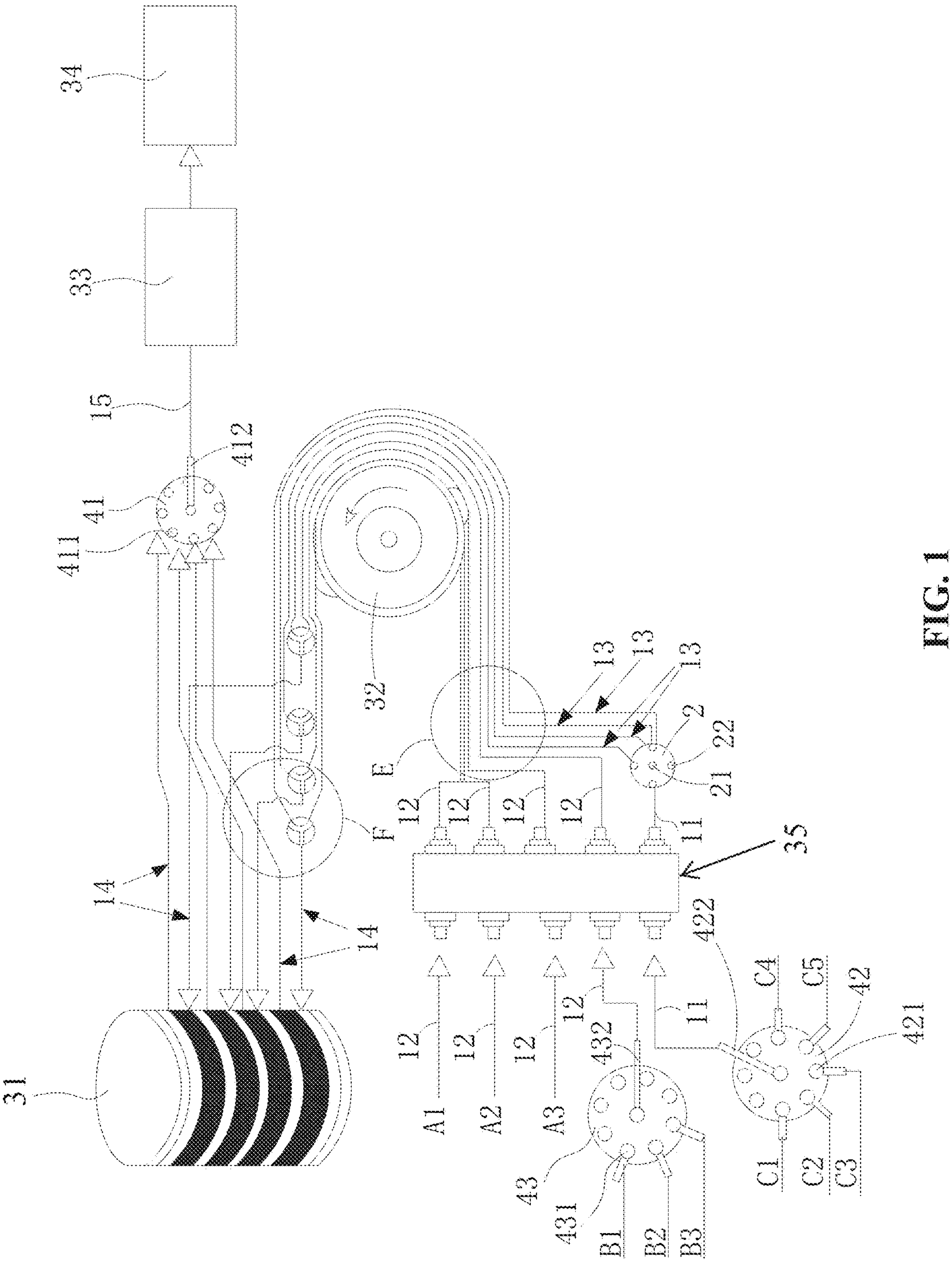
FIG. 1 is a schematic diagram of the isotope analysis system provided by an embodiment of the present disclosure.

Reference numerals in the figures:

11 represents a first liquid channel; 12 represents a second liquid channel; 13 represents a third liquid channel; 14 represents a fourth liquid channel; 15 represents a fifth liquid channel; 2 represents a diverter; 21 represents a liquid inlet pipe; 22 represents a liquid outlet pipe; 31 represents a heating reactor; 32 represents a actuator; 33 represents a cooler; 34 represents a membrane-inlet mass spectrometer; 35 represents a degassing device; 41 represents a first selector valve; 411 represents a first liquid inlet; 412 represents a first liquid outlet; 42 represents a second selector valve; 421 represents a second liquid inlet; 422 represents a second liquid outlet; 43 represents a third selector valve; 431 represents a third liquid inlet; 432 represents a third liquid outlet; A1 represents a first reagent; A2 represents a second reagent; A3 represents a third reagent; B1 represents a fourth reagent; B2 represents a fifth reagent; B3 represents a sixth reagent; C1 represents a liquid sample to be tested; C2 represents a first standard sample liquid; C3 represents a second standard sample liquid; C4 represents a third standard sample liquid; and C5 represents a fourth standard sample liquid.

DETAILED DESCRIPTION

To make the technical problems to be solved, the technical solutions, and the beneficial effects of the present disclosure clearer, the present disclosure is described in further detail below with reference to the accompanying drawings and embodiments. It should be understood that the specific examples described herein are merely intended to explain the present disclosure, rather than to limit the present disclosure.

It should be noted that, when a component is “fixed” or “provided” on another component, the component may be “fixed” or “provided” on the another component directly or indirectly. When a component is “connected” to another component, the component may be “connected” to the another component directly or indirectly.

It should be noted that, in the description of the embodiments of the present disclosure, unless otherwise specified, “/” means “or”, for example, “A/B” may mean “A or B”. The term “and/or” herein means that there are three relationships, for example, “A and/or B” may indicate that A exists alone, A and B coexist, and B exists alone. “A” and “B” may be singular or plural.

It should be understood that orientations or position relationships indicated by terms “length”, “width”, “upper”, “lower”, “front”, “rear”, “left”, “right”, “vertical”, “horizontal”, “top”, “bottom”, “inside”, “outside”, and the like are based on the orientation or position relationships shown in the accompanying drawings. These terms are just used to facilitate the description of the present disclosure and simplify the description, but not to indicate or imply that the mentioned device or elements must have a specific orientation and must be established and operated in a specific orientation, and thus these terms cannot be understood as a limitation to the present disclosure.

Moreover, the terms such as “first” and “second” are used only for the purpose of description and should not be construed as indicating or implying a relative importance, or implicitly indicating a quantity of indicated technical features. Thus, features defined with “first” and “second” may explicitly or implicitly include one or more of the features. In the description of the present disclosure, “a plurality of” means two or more, unless otherwise specifically defined.

Figure 2:
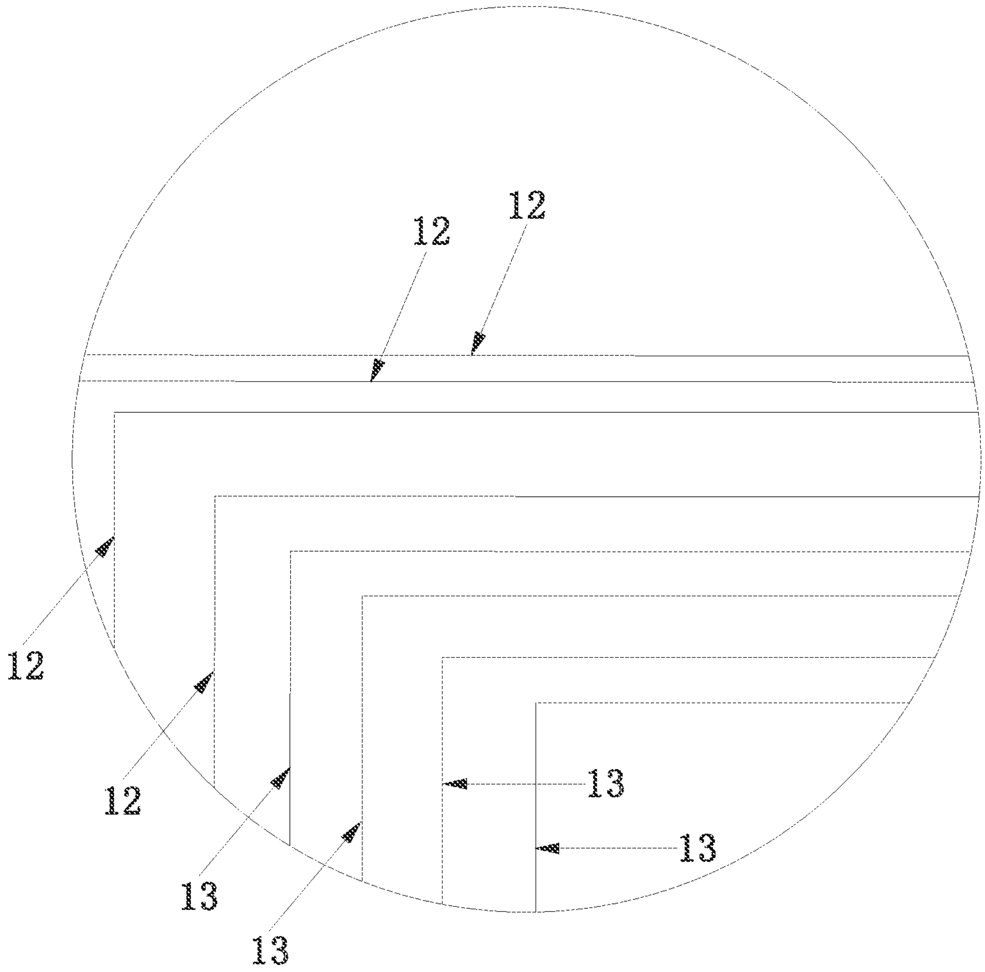
FIG. 2 is an enlarged view at E in FIG. 1.
Figure 3:
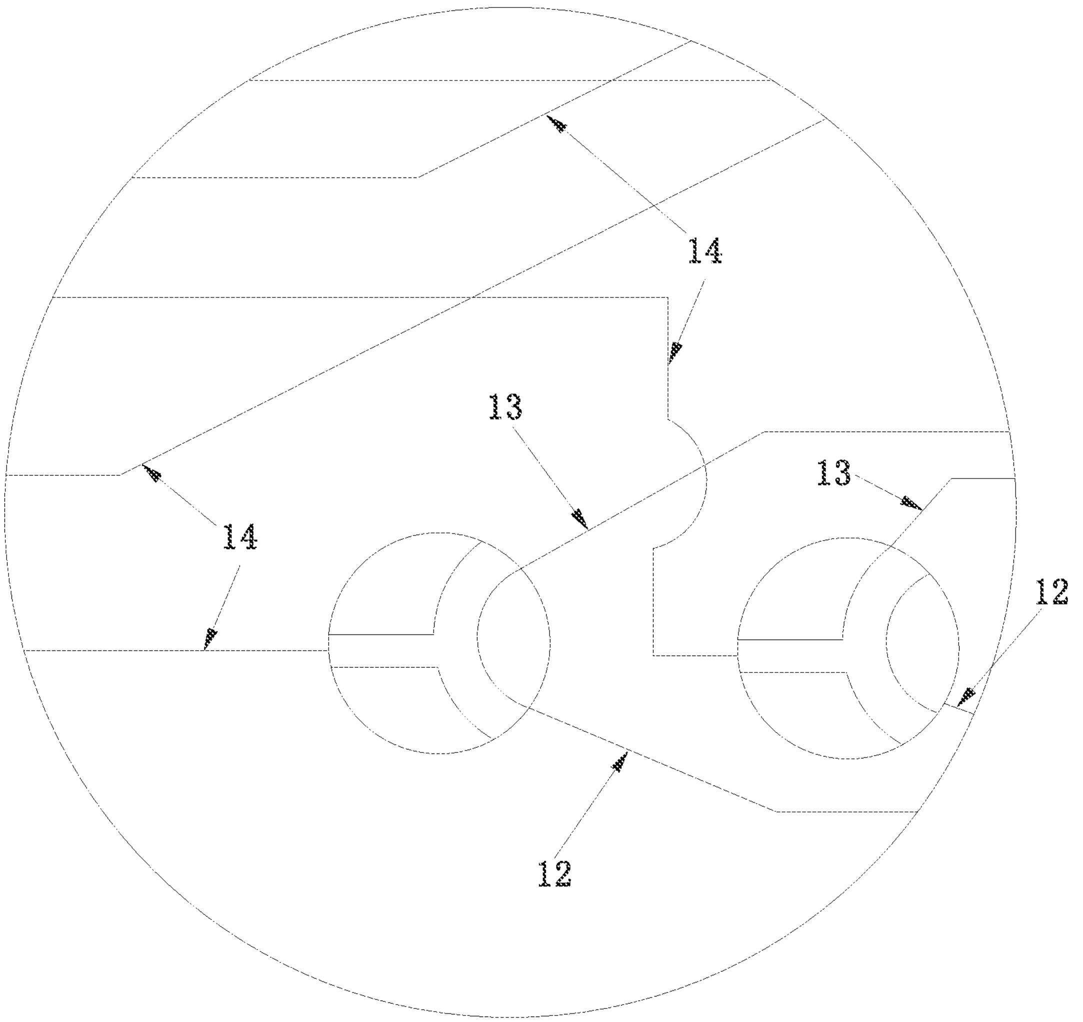
FIG. 3 is an enlarged view at F in FIG. 1.

With reference to FIG. 1 to FIG. 3, the isotope analysis system provided by the present disclosure will be described below. The isotope analysis system includes:

a first liquid channel 11, a plurality of second liquid channels 12, a plurality of third liquid channels 13, a diverter 2 configured to deliver a liquid in the first liquid channel 11 to the plurality of third liquid channels 13, a plurality of fourth liquid channels 14, and a first selector valve 41 including a first liquid outlet 412 and a plurality of first liquid inlets 411. A heating reactor 31 is provided at the fourth liquid channels 14. A third liquid channel 13 and a fourth liquid channel 14 are assigned to each of the plurality of second liquid channels 12; an inlet of the fourth liquid channel 14 is connected to both an outlet of the second liquid channel 12 and an outlet of the third liquid channel 13; and a first liquid inlet is assigned to each of the plurality of fourth liquid channels, and an outlet of the fourth liquid channel is connected to the first liquid inlet.

During detection, a liquid sample containing $^{15}$N is introduced into a diverter 2 through a first liquid channel 11. The diverter then diverts the liquid sample to a plurality of third liquid channels 13 (that is, the liquid sample in the first liquid channel 11 flows into various third liquid channels 13 through the diverter 2). The second liquid channels 12 of the system are each introduced with a unique reagent that can react with a particular $^{15}$N-containing substance (a molecule or an ion). In a fourth liquid channel 14, a reagent from a particular second liquid channel 12 combines with a liquid sample from a particular third liquid channel 13 to form a liquid mixture. A heating reactor 31 heats the liquid mixture to a predetermined temperature to react. The liquid mixture then flows from this fourth liquid channel 14 to a first selector valve 41 through a particular first liquid inlet 411 designated to this fourth liquid channel 14. The first selector valve 41 enables the communication between this first liquid inlet 411 and a first liquid outlet 41, allowing the liquid mixture to be directed out of the system through this outlet. In brief, a liquid sample from a third liquid channel 13 reacts with a specific reagent from a designated second liquid channel 12 in a designated fourth liquid channel 14. The post-reaction liquid mixture is directed out of the system through a designated first liquid inlet 411 and first liquid outlet 412 and is then monitored. In this way, reactions between the $^{15}N$-containing substance in a liquid sample with different reagents can be monitored separately and continuously.

Further, please refer to FIG. 1. As an embodiment of the isotope analysis system provided by the present disclosure, the isotope analysis system may further include: an actuator 32 configured to drive liquid flow in the plurality of second liquid channels 12 and the plurality of third liquid channels 13. The actuator 32 can drive liquid flow in the second liquid channel 12 and the third liquid channel 13, which not only increases liquid flow rate but also reduces liquid blockage.

In an embodiment, the actuator 32 may be a peristaltic pump.

In an embodiment, the peristaltic pump may be Ecoline VC-360 (8 channels) produced by Ismatec.

In an embodiment, the first selector valve 41 may further include a valve body including communication holes that define communication passages. As a result, the valve body is switchable between a plurality of communication passages through rotation. When the valve body rotates to a specific communication passage, a first liquid inlet 411 to which the communication passage is assigned communicates with a first liquid outlet 412.

In an embodiment, the heating reactor 31 can heat a liquid in the fourth liquid channel 14 to 75° C. At this temperature, the reaction can proceed at a desired rate without producing an excessive amount of steam.

In an embodiment, the liquid sample may be a water sample taken from soil leachate, river water, seawater, or groundwater.

In an embodiment, different reagents may be delivered by different second liquid channels 12.

In an embodiment, the first liquid channel 11 may be PEEK tubing with the following dimension: 0.1 m to 1 m (length)×1,580 μm (outer diameter)×508 μm (inner diameter).

In an embodiment, the fifth liquid channel 15 may be FS-coated PEEK tubing with the following dimension: 6 m (length)×1,580 μm (outer diameter)×530 μm (inner diameter). This type of tubing facilitates liquid flow, reduces product adhesion, and thus reduces the likelihood of channel blockage.

In an embodiment, the second liquid channel 12, the third liquid channel 13, and the fourth liquid channel 14 may each include a plurality of segments, and different segments may be adopt tubing of different types and sizes.

In an embodiment, a segment of the second liquid channel 12 in the actuator 32 may be Tygon® S3 E-LFL tubing with the following dimension: 15 cm (length)×508 μm (inner diameter)×1,600 μm (outer diameter). This type of tubing facilitates liquid flow and controls liquid flow rate. The other segments of the second liquid channel 12 may be PEEK tubing with the following dimension: 0.1 m to 1 m (length)×1,580 μm (outer diameter)×508 μm (inner diameter).

In an embodiment, a segment of the third liquid channel 13 in the actuator 32 may be Santoprene tubing with the following dimension: 15 cm (length)×320 μm (inner diameter)×1,600 μm (outer diameter). This type of tubing facilitates liquid flow and controls liquid flow rate. The other segments of the third liquid channel 13 may be PEEK tubing with the following dimension: 0.1 m to 1 m (length)×1,580 μm (outer diameter)×508 μm (inner diameter).

In an embodiment, segments of the fourth liquid channel 14 at a heating reactor 31 and after the heating reactor 31 may each be FS-coated peek tubing with the following dimension: 6 m (length)×1,580 μm (outer diameter)×530 μm (inner diameter); and segments of the fourth liquid channel 14 before the heating reactor 31 may each be PEEK tubing with the following dimension: 1 m (length)×0.508 mm (inner diameter)×1.6 mm (outer diameter). This type of tubing facilitates liquid flow, reduces the adhesion of a product, and reduces the possibility of pipe blockage.

In an embodiment, the first selector valve 41 may be Low Pressure Stream Selector manufactured by VICI. In an embodiment, the first selector valve 41 may be a selector valve with 1/16" Valco ZDV fittings. In an embodiment, the first selector valve 41 could be a 4 position selector, a 6 position selector, or an 8 position selector. In an embodiment, a communication interface of the first selector valve 41 may be an RS232 interface.

Further, please refer to FIG. 1. As an embodiment of the isotope analysis system provided by the present disclosure, a heat source of the heating reactor 31 may be an electric heating source; each fourth liquid channel 14 may surround the electric heating source. An electric heating source gives high heating efficiency.

In an embodiment, the reaction at the heating reactor 31 may be conducted for 7 min. In an embodiment, the reaction system may be heated to and kept at 75° C.

In an embodiment, the heating reactor 31 may include a hollow aluminum column, a fourth liquid channel 14 may wrap the hollow aluminum column, and the heat source may heat a liquid in the fourth liquid channel 14 through the hollow aluminum column.

In an embodiment, the heat source may be an electric heating wire.

In an embodiment, the heat source may include an electric heater, a temperature sensor, and a temperature control element.

Further, please refer to FIG. 1. As an embodiment of the isotope analysis system provided by the present disclosure, the isotope analysis system may further include: a fifth liquid channel 15 communicating with the first liquid outlet 412 and a cooler 33 provided at the fifth liquid channel 15. The cooler 33 can cool the liquid mixture in the fifth liquid channel 15 to room temperature, which facilitates the subsequent detection. In an embodiment, the cooler 33 may achieve cooling through an air-cooling fin. In an embodiment, the cooler 33 may achieve cooling through a cooling agent such as an ice pack.

Further, please refer to FIG. 1. As an embodiment of the isotope analysis system provided by the present disclosure, the isotope analysis system may further include: a membrane-inlet mass spectrometer 34 communicating with the fifth liquid channel 15. The membrane-inlet mass spectrometer 34 can analyze the product in the fifth liquid channel 15 to give information on product content and isotope (e.g. $^{15}N$) abundance of the product.

In an embodiment, the membrane-inlet mass spectrometer 34 may be Hiden HPR-40 MIMS System manufactured by Hiden Analytical, UK.

Further, please refer to FIG. 1. As an embodiment of the isotope analysis system provided by the present disclosure, the isotope analysis system may further include: a degassing device 35 configured to remove a gas in the first liquid channel 11 and the plurality of second liquid channels 12. The degassing device 35 can remove bubbles or a dissolved gas from the first liquid channel 11 and the second liquid channels 12, thus preventing bubbles or dissolved gas from interfering with subsequent mixing processes or reactions.

In an embodiment, the degassing device 35 may be a membrane degassing device.

In an embodiment, the degassing device 35 may be DEGASi Compact Stand Alone Degasser, Systec AF.

Further, please refer to FIG. 1. As an embodiment of the isotope analysis system provided by the present disclosure, the diverter 2 may be provided with a liquid inlet pipe 21 and a plurality of liquid outlet pipes 22; an inlet of the liquid inlet pipe 21 communicates with an outlet of the first liquid channel 11, and an outlet of the liquid inlet pipe 21 communicates with an inlet of each of the plurality of liquid outlet pipes 22; and an outlet of each of the plurality of liquid outlet pipes 22 is connected to an inlet of a specific third liquid channel 13. The liquid in the first liquid channel 11 first flows into the liquid inlet pipe 21 of the diverter 21, then into the plurality of liquid outlet pipes 22, and finally into the plurality of third liquid channels 13.

Further, please refer to FIG. 1. As an embodiment of the isotope analysis system provided by the present disclosure, the isotope analysis system may further include: a second selector valve 42 including a second liquid outlet 422 and a plurality of second liquid inlets 421, where an inlet of the first liquid channel 11 communicates with the second liquid outlet 422. Different second liquid inlets 421 can be used to input different sample liquids into the second selector valve 42, and by enabling communication between the second liquid outlet 422 and various second liquid inlets 421, different sample liquids in the various second liquid inlets 421 can be discharged separately into the first liquid channel 11 through the second liquid outlet 422.

In an embodiment, the second selector valve 42 may further include a valve body including communication holes that define communication passages. As a result, the valve body is switchable between a plurality of communication passages through rotation. When the valve body rotates to a specific communication passage, a second liquid inlet 421 to which the communication passage is assigned communicates with a second liquid outlet 422.

In an embodiment, the second selector valve 42 may be Low Pressure Stream Selector manufactured by VICI. In an embodiment, the second selector valve 42 may be a selector valve with 1/16" Valco ZDV fittings. In an embodiment, the second selector valve 42 may be a 4 position selector, a 6 position selector, or an 8 position selector. In an embodiment, a communication interface of the second selector valve 42 may be an RS232 interface.

In an embodiment, the isotope analysis system may further include: a third selector valve 43 including a third liquid outlet 432 and a plurality of third liquid inlets 431, where an inlet of a second liquid channel 12 communicates with the third liquid outlet 432. Different third liquid inlets 431 can be used to input different reagents into the third selector valve 43, and by enabling communication between the third liquid outlet 432 and various third liquid inlets 431, different reagents in the various third liquid inlets 431 can be discharged separately into the second liquid channel 12 through the third liquid outlet 432.

In an embodiment, the third selector valve 43 may further include a valve body including communication holes that define communication passages. As a result, the valve body is switchable between a plurality of communication passages through rotation. When the valve body rotates to a specific communication passage, a third liquid inlet 431 to which the communication passage is assigned communicates with a third liquid outlet 432.

In an embodiment, the third selector valve 43 may be Low Pressure Stream Selector manufactured by VICI. In an embodiment, the third selector valve 43 may be a selector valve with 1/16" Valco ZDV fittings. In an embodiment, the third selector valve 43 may be a 4 position selector, a 6 position selector, or an 8 position selector. In an embodiment, a communication interface of the third selector valve 43 may be an RS232 interface.

In an embodiment, a fourth reagent B1 may enter a second liquid channel 12 through a third liquid inlet 431 of the third selector valve 43. In an embodiment, a fifth reagent B2 may enter another second liquid channel 12 through another third liquid inlet 431 of the third selector valve 43. In an embodiment, a sixth reagent B3 may enter still another second liquid channel 12 through still another third liquid inlet 431 of the third selector valve 43.

In an embodiment, the fifth reagent B2 may be HCl. In an embodiment, the sixth reagent B3 may be water. In this way, the second liquid channels 12 can be rinsed with HCl and water. In an embodiment, the rinsing may be conducted as follows: after the fourth reagent B1 stayed in the second liquid channel 12 for 3 minutes, the second liquid channel is rinsed with $H_2O$ for 1 min, then with HCL for 1 min. The fourth reagent B1 can be introduced again afterwards. In an embodiment, the fourth reagent B1 may be a NaBrO solution.

Further, please refer to FIG. 1. As an embodiment of the isotope analysis system provided by the present disclosure, four second liquid channels 12 may be provided, in which case four different reagents can be delivered separately through the four second liquid channels 12.

In the present disclosure, M stands for mol/L (moles per liter).

In the present disclosure, mg N/mL stands for mg/mL nitrogen.

In an embodiment, an inlet of a second liquid channel 12 may communicate with a container filled with a first reagent A1. The first reagent A1 reacts with $NH_2OH$ in the first liquid channel 11 for subsequent detection. In an embodiment, the reaction may be (1) $NH_2OH+NO_2^-\rightarrow N_2O+H_2O+OH^-$; and/or (2) $4Fe^{3+}+2\ NH_2OH\rightarrow 4Fe^{2+}+N_2O+H_2O+4H+NH_2OH$.

In an embodiment, the first reagent A1 may enter a second liquid channel 12 after passing through the degassing device 35.

In an embodiment, an inlet of a second liquid channel 12 may communicate with a container filled with a second reagent A2. The second reagent reacts with $NO_2^-$ in the first liquid channel 11 for subsequent detection. In an embodiment, the reaction is as follows: $NO_2^-+2\ KI+H^+\rightarrow NO+KI.I+KOH$. In an embodiment, the second reagent A2 is prepared from reagents including 78% $H_3PO_4$, 0.2 mol KI, and distilled water. Preparation method of A2: 33.2 g (0.2 mol) of KI is dissolved in 1 L of water with stirring to produce a 0.2 M KI solution; and 75 mL of 78% $H_3PO_4$, 30 mL of the 0.2 M KI solution, and 95 mL of distilled water are mixed to obtain the second reagent A2; alternatively, 70 mL of 78% $H_3PO_4$, 30 mL of the 0.2 M KI solution, and 100 mL of distilled water are mixed to obtain the second reagent A2.

In an embodiment, the second reagent A2 may enter a second liquid channel 12 after passing through the degassing device 35.

In an embodiment, an inlet of a second liquid channel 12 may communicate with a container filled with a third reagent A3. The third reagent reacts with $NO_3^-$ in the first liquid channel 11 for subsequent detection. In an embodiment, the reaction is as follows: $NO_3^- + 3\ V^{3+} + 4\ H^+ \rightarrow NO + 3\ V^{4+} + 2H_2O$. In an embodiment, the third reagent A3 is prepared from reagents including $H_2O$, 0.1 M $VCl_3$, and 37% HCl. Preparation of 100 mL of A3: 1.57 g of $VCl_3$ and 16 mL of 37% HCl are mixed, and then distilled water is added until a total volume is 100 mL. When a segment of the second liquid channel 12 in the actuator 32 is Tygon® S3 E-LFL tubing with the following dimension: 15 cm (length)×508 μm (inner diameter)×1,600 μm (outer diameter) and a segment of the third liquid channel 13 in the actuator 32 is Santoprene tubing with the following dimension: 15 cm (length)×320 μm (inner diameter)×1,600 μm (outer diameter), the ratio of A3 volume to sample volume is at least 1:1; for example, 3 mL of A3 may be used for 2 mL to 3 mL of a sample.

In an embodiment, the third reagent A3 may enter a second liquid channel 12 after passing through the degassing device 35.

In an embodiment, an inlet of a second liquid channel 12 may communicate with a container filled with a fourth reagent B1, where the fourth reagent B1 reacts with $NH_4^+$ in the first liquid channel 11 for subsequent detection. In an embodiment, a reaction process for the $NH_4^+$ can be as follows: $2\ NH_4^+ + 3\ BrO^- + 2\ OH^- \rightarrow N_2 + 5\ H_2O + 3\ Br^-$. In an embodiment, the fourth reagent B4 is prepared from reagents including $Br_2$, $H_2O$, KI, and NaOH. Preparation of the fourth reagent B1: 20 g of NaOH is dissolved in 200 mL of $H_2O$ under cooling to obtain a solution; after the solution is cooled to 4° C., 2 mL of $Br_2$ is added with vigorous shaking until the solution turns orange-yellow; the solution is placed overnight in a refrigerator; and then 50 mL of $H_2O$, in which 0.25 g of KI is dissolved, is added to the solution to stabilize the NaOBr solution obtained. A chemical reaction that takes place during the preparation is as follows: $2\ NaOH + Br_2 \rightarrow NaOBr + NaBr + H_2O$. The NaOBr solution can be used directly to react with a sample. It should be noted that the NaOBr solution is stable only under alkaline conditions and should always be stored at 4° C. to maintain the molarity of the hypobromite. According to theoretical calculations, a freshly-prepared NaOBr solution includes 0.156 M $BrO^-$; the molarity should be examined every 4 weeks. In addition, the NaOBr solution should be subjected to visual inspection for suspended particles; if necessary, particles are filtered through G3 frit.

In an embodiment, the fourth reagent B1 may enter a second liquid channel 12 after passing through the degassing device 35.

In an embodiment, the fifth reagent B2 may enter a second liquid channel 12 after passing through the degassing device 35.

In an embodiment, the sixth reagent B3 may enter a second liquid channel 12 after passing through the degassing device 35.

In an embodiment, the liquid sample C1 to be tested may be a water sample from soil leachate, river water, seawater, or groundwater.

In an embodiment, a first standard sample liquid C2 may be a $NH_2OH$ solution with a predetermined concentration. In an embodiment, a $NH_2OH$ standard sample liquid may be prepared as follows: hydroxylamine hydrochloride is dissolved in deionized water according to the following standards: 10 mg N/mL=49.257 g $NaNO_3$; 1 mg N/mL=4.9257 g $NaNO_3$; 0.1 mg N/mL=0.4926 g $NaNO_3$; $^{15}N$ content: 1 to 10 atom %.

In an embodiment, a second standard sample liquid C3 may be a $NO_2^-$ solution with a predetermined concentration. In an embodiment, the second standard sample liquid can be prepared according to Chinese Patent CN110763535A. In an embodiment, a nitrite standard sample liquid may be prepared as follows: $NaNO_2$ is dissolved in deionized water according to the following standards: 10 mg N/mL=49.257 g $NaNO_2$; 1 mg N/mL=4.9257 g $NaNO_2$; 0.1 mg N/mL=0.4926 g $NaNO_2$; $^{15}N$ content: 1 to 10 atom %.

In an embodiment, a third standard sample liquid C4 may be a $NO_3^-$ solution with a predetermined concentration. In an embodiment, a nitrate standard sample liquid may be prepared as follows: $NaNO_3$ is dissolved in deionized water according to the following standards: 10 mg N/mL=49.257 g $NaNO_3$; 1 mg N/mL=4.9257 g $NaNO_3$; 0.1 mg N/mL=0.4926 g $NaNO_3$; $^{15}N$ content: 1 to 10 atom %.

In an embodiment, a fourth standard sample liquid C5 may be a $NH_4^+$ solution with a predetermined concentration.

In an embodiment, the liquid sample C1 to be tested may enter the first liquid channel 11 after passing through the degassing device 35.

In an embodiment, the first standard sample liquid C2 may enter the first liquid channel 11 after passing through the degassing device 35.

In an embodiment, the second standard sample liquid C3 may enter the first liquid channel 11 after passing through the degassing device 35.

In an embodiment, the third standard sample liquid C4 may enter the first liquid channel 11 after passing through the degassing device 35.

In an embodiment, the fourth standard sample liquid C5 may enter the first liquid channel 11 after passing through the degassing device 35.

In an embodiment, the peristaltic pump, the reactor, and the membrane-inlet mass spectrometer 34 may be each controlled by Lab VIEW.

The above are merely preferred embodiments of the present disclosure, and are not intended to limit the present disclosure. Any modifications, equivalent replacements, improvements, and the like made within the spirit and principle of the present disclosure shall be all included in the protection scope of the present disclosure.

The invention claimed is:

1. An isotope analysis system, comprising:

a first liquid channel;

a plurality of second liquid channels;

a plurality of third liquid channels;

a plurality of fourth liquid channels, wherein a heating reactor is provided at the fourth liquid channels;

a diverter configured to divert liquid from the first liquid channel to the plurality of third liquid channels; and a first selector valve comprising a first liquid outlet and a plurality of first liquid inlets;

wherein a third liquid channel and a fourth liquid channel are assigned to each of the plurality of second liquid channels; an end of the fourth liquid channel is connected to both an end of the second liquid channel and an end of the third liquid channel;

wherein a first liquid inlet is assigned to each of the plurality of fourth liquid channels, and another end of the fourth liquid channel is connected to the first liquid inlet; and wherein the heating reactor is an electric heating source; and each of the plurality of fourth liquid channels comprises a segment wrapping around the electric heating source.

2. The isotope analysis system according to claim 1, further comprising an actuator configured to drive liquid flow in the plurality of second liquid channels and the plurality of third liquid channels.

3. The isotope analysis system according to claim 2, wherein the actuator is a peristaltic pump.

4. The isotope analysis system according to claim 1, further comprising: a fifth liquid channel communicating with the first liquid outlet and a cooler provided at the fifth liquid channel.

5. The isotope analysis system according to claim 4, further comprising a membrane-inlet mass spectrometer communicating with the fifth liquid channel.

6. The isotope analysis system according to claim 1, further comprising: a degassing device configured to remove a gas in the first liquid channel and the plurality of second liquid channels.

7. The isotope analysis system according to claim 1, wherein the diverter comprises a liquid inlet pipe and a plurality of liquid outlet pipes;

wherein an inlet of the liquid inlet pipe communicates with an outlet of the first liquid channel, and an outlet of the liquid inlet pipe communicates with an inlet of the plurality of liquid outlet pipes; and an outlet of each of the plurality of liquid outlet pipes is connected to an inlet of a specific third liquid channel.

8. The isotope analysis system according to claim 1, further comprising a second selector valve and/or a third selector valve, wherein the second selector valve comprises a second liquid outlet and a plurality of second liquid inlets, and the second liquid outlet communicates with an inlet of the first liquid channel;

wherein the third selector valve comprises a third liquid outlet and a plurality of third liquid inlets, and the third liquid outlet communicates with an inlet of the plurality of second liquid channels.

9. The isotope analysis system according to claim 1, wherein the isotope analysis system is provided with four second liquid channels.

10. The isotope analysis system according to claim 2, wherein the isotope analysis system is provided with four second liquid channels.

11. The isotope analysis system according to claim 3, wherein the isotope analysis system is provided with four second liquid channels.

12. The isotope analysis system according to claim 4, wherein the isotope analysis system is provided with four second liquid channels.

13. The isotope analysis system according to claim 5, wherein the isotope analysis system is provided with four second liquid channels.

14. The isotope analysis system according to claim 7, wherein the isotope analysis system is provided with four second liquid channels.

15. The isotope analysis system according to claim 7, wherein the isotope analysis system is provided with four second liquid channels.

16. The isotope analysis system according to claim 8, wherein the isotope analysis system is provided with four second liquid channels.

* * * * *